United States Patent
Norton et al.

(10) Patent No.: US 8,838,347 B2
(45) Date of Patent: Sep. 16, 2014

(54) AUTOMATIC GROUND CONTACT PRESSURE SYSTEM FOR PNEUMATIC COMPACTOR

(75) Inventors: Mark Lee Norton, Eden Prairie, MN (US); Jon Michael Scharf, Maple Grove, MN (US); Michael William Ries, Coon Rapids, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 346 days.

(21) Appl. No.: 13/278,870

(22) Filed: Oct. 21, 2011

(65) Prior Publication Data

US 2013/0103268 A1   Apr. 25, 2013

(51) Int. Cl.
*G06F 7/70* (2006.01)
*B60C 23/00* (2006.01)
*G06F 7/00* (2006.01)
*E01C 19/27* (2006.01)

(52) U.S. Cl.
CPC .. *G06F 7/00* (2013.01); *E01C 19/27* (2013.01)
USPC ............................................ 701/50; 340/442

(58) Field of Classification Search
None
See application file for complete search history.

(56) References Cited

U.S. PATENT DOCUMENTS

| | | | |
|---|---|---|---|
| 3,108,520 A * | 10/1963 | Garis et al. | 404/132 |
| 3,381,769 A * | 5/1968 | Reisser | 180/24.04 |
| 3,636,835 A * | 1/1972 | Reisser | 404/130 |
| 3,890,056 A | 6/1975 | Domenighetti | |
| 5,121,680 A * | 6/1992 | Nordberg | 100/12 |
| 5,279,216 A * | 1/1994 | Nordberg | 100/269.19 |
| 5,629,874 A | 5/1997 | Mittal | |
| 6,236,923 B1 | 5/2001 | Corcoran et al. | |
| 7,302,837 B2 | 12/2007 | Wendte | |
| 2012/0000586 A1 * | 1/2012 | Kami | 152/209.18 |

* cited by examiner

*Primary Examiner* — Mussa A Shaawat
(74) *Attorney, Agent, or Firm* — Miller, Matthias & Hull

(57) ABSTRACT

A ground contact pressure controller may be configured to automatically manage tire inflation pressure in a pneumatic compactor machine. The controller may determine a target tire inflation pressure for the machine according to the parameters of, inter alia, machine weight, number of tires on the machine, ground contact area of the tires, compaction surface type, and ambient temperature. The machine may include a compressor and vent unit coupled to the pneumatic tires, and the compressor and vent unit may be configured to adjust the tire pressure of the pneumatic tires according to a target tire pressure. A unified pressure subsystem coupled to the compressor and vent unit may be configured to measure pressure of the tires, and to adjust tire pressure to the target pressure.

15 Claims, 3 Drawing Sheets

AUTOMATIC GROUND CONTACT PRESSURE SYSTEM FOR PNEUMATIC COMPACTOR

TECHNICAL FIELD

The present disclosure relates to pneumatic compactor machines, and more particularly, to an apparatus for automatically controlling ground contact pressure of the compactor during its operation.

BACKGROUND

Compactor machines, also variously called compactors and compaction machines, are frequently employed for compacting dirt, gravel, asphalt and other compactable surfaces associated with roadbed and other land areas. One such type of compaction machine is a drum-type compactor having one or more drums adapted to compact the particular surface over which the compactor is being driven. In order to compact the surface, the drum-type compactor may include a drum assembly having a vibratory mechanism that includes inner and outer eccentric weights arranged on rotatable shafts situated within the drum. Both amplitude and frequency of vibration may be controlled to establish degree of compaction.

Another type of compactor machine is a pneumatic wheel roller-style of compactor, which is dependent upon tire pressure for achieving effective compaction. For successful operation of the pneumatic compactor, the ground contact pressures should be managed in accordance with compaction surface type. Typically, an operator estimates a contact pressure based upon weight of the machine, air pressure of the tires, and compaction conditions in accordance with a chart provided by the machine manufacturer. Overall weight of the machine may be controlled by adding ballast such as sand and/or water, according to a specific ground compaction task. However, inaccurate estimates of proper tire pressures for given compaction surface conditions and types may degrade the compactor's performance.

Accordingly, it would be beneficial to provide a system for controlling a pneumatic compactor that does not require operator intervention, and is thus fully automated and capable of dynamically achieving appropriate tire pressures for any given compaction surface type.

SUMMARY

In accordance with one aspect of the present disclosure, a ground contact pressure system for use in a pneumatic compactor machine is disclosed. The apparatus may include a controller configured to determine a target tire pressure according to a machine weight, a number of tires, a tire ground contact area, a compaction surface type, and ambient temperature. The controller may be further configured to receive a current tire pressure from a unified tire pressure subsystem, to determine a tire adjustment pressure according to the difference between the current tire pressure and the target tire pressure, and to transmit the tire adjustment pressure to the unified pressure subsystem.

In accordance with another aspect of the present disclosure, the ground contact pressure system may be utilized within a compactor machine to effectively and automatically provide appropriate tire inflation pressures for any given type of compaction surface, and provide a real-time ground contact pressure readout display.

In accordance with another aspect of the present disclosure, the ground contact pressure system may automatically provide current machine weight via measurement of machine suspension displacement.

In accordance with another aspect of the present disclosure, a method of controlling ground contact pressure includes an input device adapted to receive inputs of weight of the compactor machine, number of tires, total tire ground contact area, ambient temperature, and a compaction surface type, for determining and making an appropriate tire pressure adjustment by inflating or deflating tire pressure with an air compressor and vent unit to achieve desired tire pressure.

In accordance with another aspect of the present disclosure, a compactor machine includes a pneumatic tire and a compressor and vent unit coupled to the pneumatic tire, wherein the vent unit is configured to adjust tire pressure in accordance with the difference between current tire pressure and a target tire pressure.

In accordance with yet another aspect of the present disclosure, a compactor machine may incorporate a system wherein the tires are under a unified pressure control system under which the plurality of compactor tires may be incrementally inflated and/or deflated collectively to provide a common dynamically determined tire inflation pressure target.

DETAILED DESCRIPTION

Figure 1:
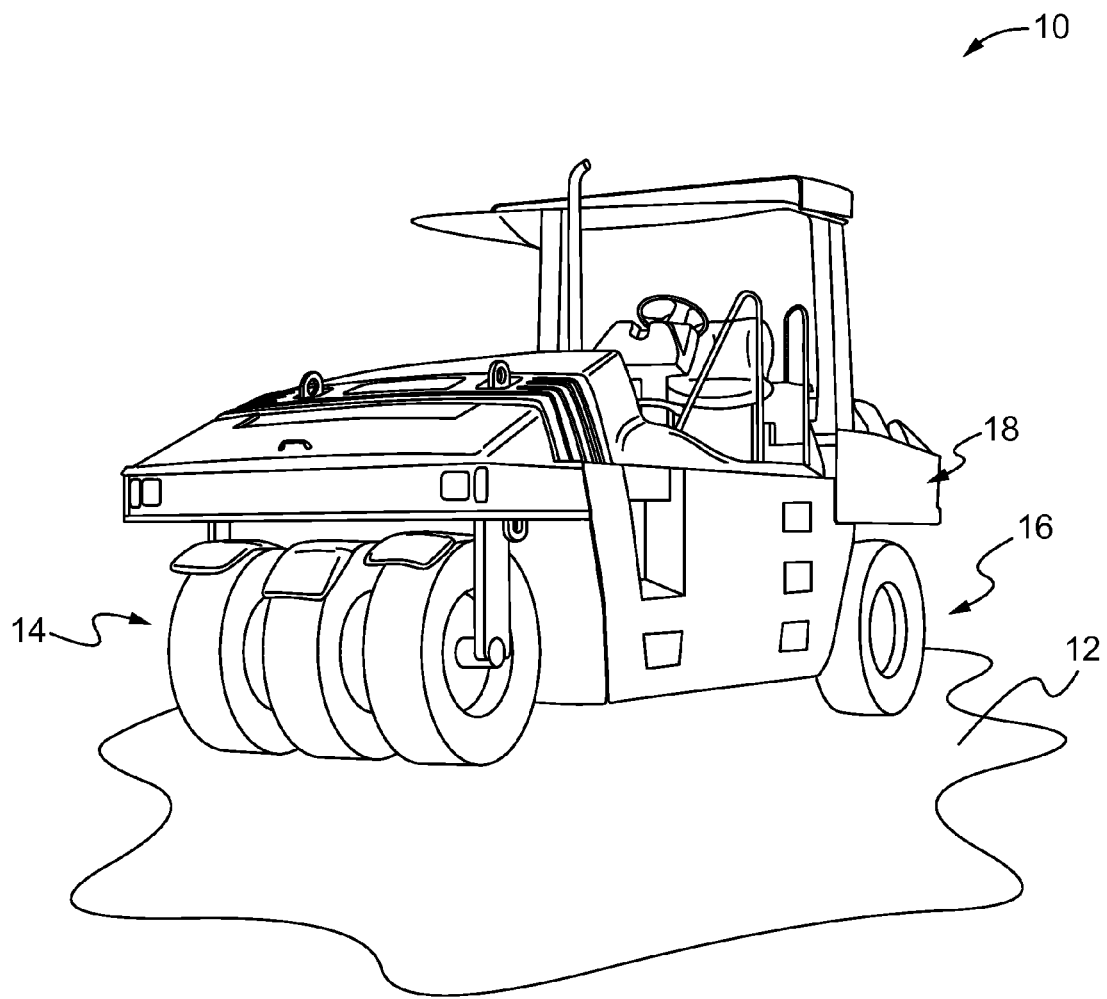
FIG. 1 is a perspective view of a pneumatic compactor machine that embodies elements of the present disclosure.

Making initial reference to FIG. 1, a pneumatic compactor machine 10 may be useful for compacting and/or increasing density of a compaction surface 12, such as dirt, gravel, and/or bituminous mixtures. The machine 10 may have a set of front compacting wheels containing pneumatically inflated tires 14 and a set of rear compacting wheels also containing pneumatically inflated tires 16, both front and rear sets of tires 14, 16 being rotatably mounted on a main frame 18 of the machine 10.

It will be appreciated by those skilled in the art that actual performance of a pneumatic compactor machine will vary as a function tire inflation pressure and the softness or hardness of the surface being compacted. Thus, low tire inflation pressures will generally improve traction and durability of a compactor machine on softer ground, for example, while higher tire inflation pressures will provide more efficient results on firmer surfaces. To the extent that the compaction surface may be softer and of lower density in early stages of the compaction process, the surface will generally become increasingly denser and hence more firm after several passes of the compactor machine over the surface. As such, it may be advantageous to vary the tire inflation pressure as a function of real-time density of the compaction surface.

The main frame 18 may also support ballast or a ballast tank (not shown) for providing additional weight to the machine 10 in accordance with and/or to meet surface compaction demands. Such a ballast tank may be filled with sand or water, or other substances including liquid antifreeze solutions during cold winter operation. The plurality of tires of each of the respective front and rear sets, 14 and 16, may be structurally and operatively equivalent, or in some instances, the size and structure of the front and rear tires may deviate from each other. In general, all aspects of the described operability and functional effects will apply with equal force, whether or not the front tire set differs from the rear tire set.

Figure 2:
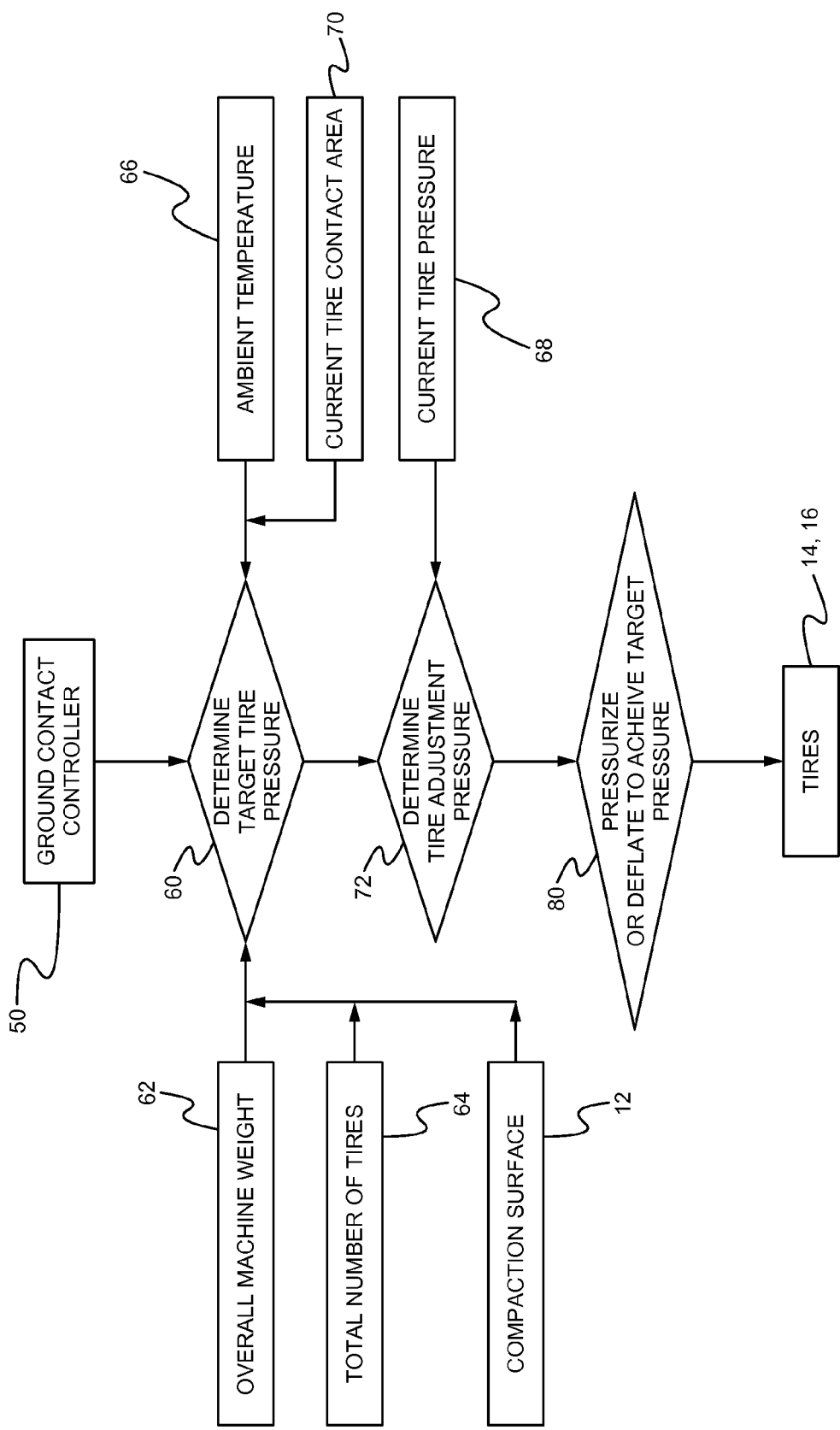
FIG. 2 is a block diagram representing an algorithm of one preferred operation of the ground contact pressure system embodied in the compactor machine of FIG. 1.

Referring now to FIG. 1 and FIG. 2, according to an embodiment herein, the machine 10 may include an electronic ground contact pressure controller 50 which operates as an onboard tire inflation management system. The controller 50 is adapted to measure actual tire inflation pressure, and to automatically achieve and maintain any given target tire inflation pressure. In order to achieve this result, the machine 10 includes an air compressor and at least one vent valve (described below) to manage tire pressure of both sets of tires 14, 16. Additionally, each of the tires may be pneumatically interconnected, such that all pressures within each tire may be equivalent or may vary in accordance with any particular desired operation.

In the disclosed embodiment of FIG. 2, the controller 50 may be programmed with relevant parameters of the machine 10, including, e.g., compaction surface 12, overall machine weight 62, number of tires 64, ambient temperature 66, and tire ground contact area 70. Armed with said parameters, the controller 50 may be programmed to automatically calculate an appropriate ground contact pressure, display same for the operator while recording same for future reference, and to adjust the contact pressure in real time for achieving maximum compaction efficiency.

By way of example, and in further reference to FIG. 2, the controller 50 may be programmed as shown to determine a target tire pressure as shown at 60, utilizing the identified parameters including compaction surface 12, overall machine weight 62, number of tires 64, ambient temperature 66, and tire ground contact area 70. Once such determination has been made, the controller 50 may then determine a target tire pressure as shown at 72, by comparing the input of any current tire pressure 68 with any determined target tire pressure 60. Thereafter, the controller may use the determined target tire pressure to provide a signal to inflate or deflate the tires in order to achieve the target tire pressure, as shown at 80.

The controller 50 may also be programmed with additional enhancements. In particular, a machine cab data display unit (described below) may provide a real-time readout of actual ground contact pressure rather than actual tire pressure, a directly controlled parameter. The controller 50 may support capability for receiving a ground contact area for only one tire, but then may convert same to a total ground contact area based upon actual number of tires.

In addition, the controller 50 may support the capability of determining and displaying current weight of the machine 10 by utilizing an electronic sensing of the machine's suspension displacement. As noted earlier, the use of ballast, including sand, water, etc. may be employed to effectively change overall machine weight in accordance with predetermined compaction demands.

The controller 50 may be part of a comprehensive system wherein the plurality of tires may be collectively managed under a unified pressure subsystem under which the compactor tires may be incrementally inflated and/or deflated collectively to achieve a common dynamically determined tire inflation pressure target. The controller 50 may also be configured to record ground contact pressure for future reference. In addition, the controller 50 may have an operator override capability as described below.

Figure 3:
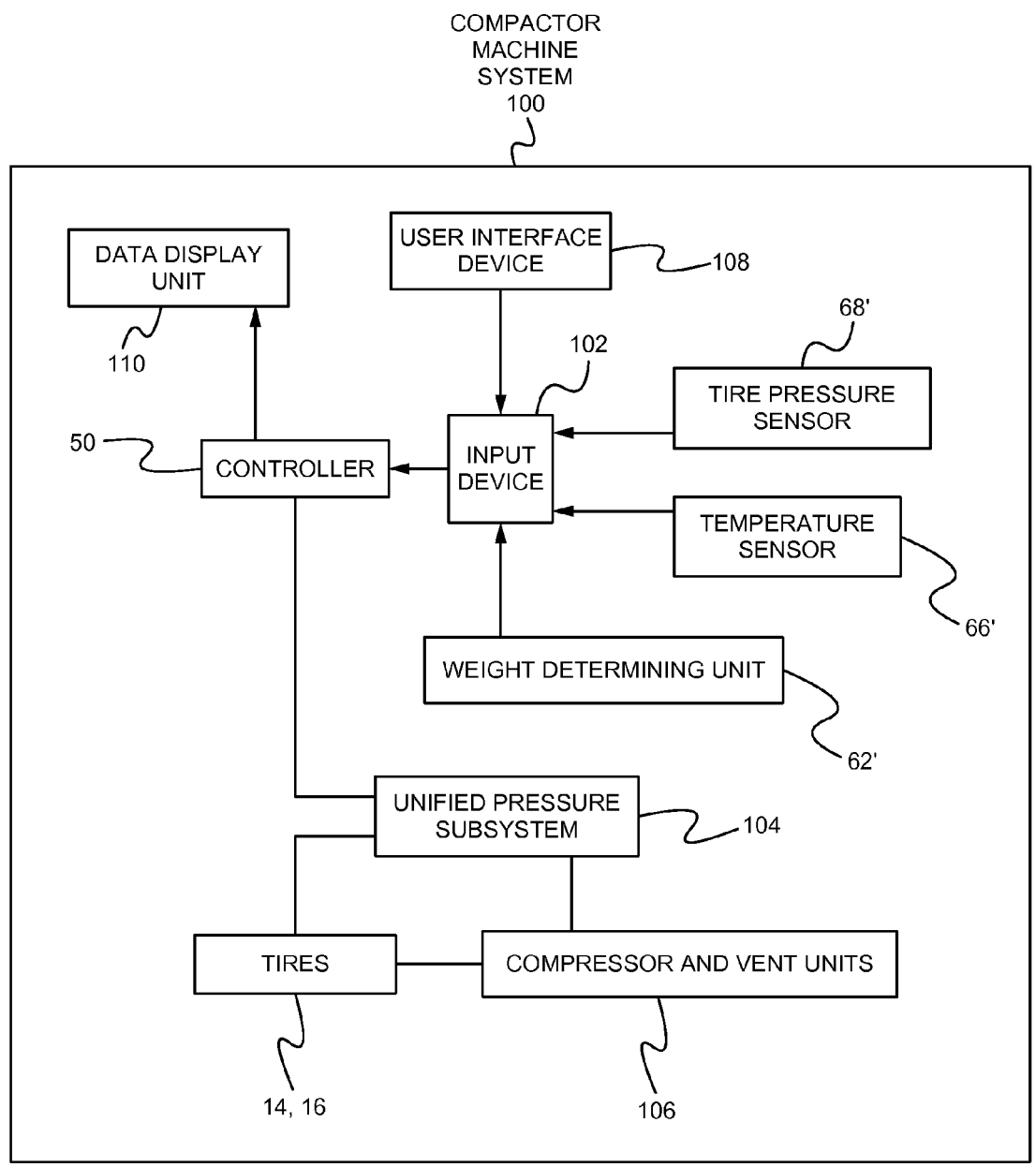
FIG. 3 is a schematic depiction of several subsystems and units that may be included within the physical compactor machine of FIG. 1.

In reference to FIG. 3, a compactor machine system 100 may incorporate the controller 50, an input device 102, a unified pressure subsystem 104, and compressor and vent units 106 for adjusting tire pressure in the sets of tires 14, 16. The system 100 may also include an optional weight determining unit 62', an optional temperature sensor 66', and an optional tire pressure sensor 68', and provide a dynamic in-cab data display unit 110 to exhibit all relevant system parameters for the benefit of the operator.

The input device 102 may be adapted for receiving various input signals, related to various indicia including target pressure override parameters, the number of tires, compaction surface, and/or machine statistics such as the machine weight and/or the ballast weight. Further, the noted weight determining unit 62' may dynamically determine the weight of the compactor machine in addition to any added loads such as a ballast or operator.

In the disclosed embodiment, the controller 50 and the system 100 may work in concert, although the described controller and system may operate independently or in some modified combination.

The unified pressure subsystem 104 of the compactor machine system 100 may comprise a pneumatic conduit structure configured to assure that all individual tire pressures remain substantially equivalent. The subsystem 104 may thus provide a physical mechanism through which each individual tire is in open and direct communication with the compressor and vent units 106.

Finally, a user interface device 108 may be adapted to enable a user of the machine 10 to override any outputs of the controller 50 if and/or as may be deemed appropriate. As may be appreciated in reference to FIG. 3, the unified pressure subsystem 104, interconnected to the tire sets 14 and 16 through the compressor and vent units 106, may be effectively managed by the controller 50 to carry out continuously varying tire pressure adjustments on demand.

Industrial Applicability

In general, the present disclosure may prove particularly useful for pneumatic compactor machines. It may also be useful for other industrial machines, including but not limited to certain loaders and various work machines used in construction, agriculture, and industrial environments.

In operation, the pneumatic compactor machine 10 may be used to compact a compactable surface, such as an asphalt roadbed, a dirt landfill, or an underlayment of crushed gravel for an airport runway. The associated ground contact controller 50 may be useful to automatically maintain a desired or target ground contact pressure by selectively pressurizing and deflating the tires 14, 16 of the compactor machine 10. The controller 50 may be adapted to maintain such target ground contact pressure by utilizing at least the inputs of overall machine weight, number of tires, current tire pressure, current tire contact area, and ambient temperature. In the disclosed embodiment, the operator may have the benefit of managing a target ground contact pressure directly from the vehicle cab, and in some instances may be able to deliberately override the controller outputs via the user interface device 108 when deemed appropriate to the machine operator. For example, if compaction surface conditions are substantially out of range of the normal or predicted, the controller 50 may provide capability for real-time adjustment of its base algorithm.

Finally, additional features of real-time ground contact pressure recordal, and determination of machine overall weight from suspension displacement may benefit the operator in his or her override decisions.

What is claimed is:

1. A compactor machine comprising:
   a pneumatic tire;
   a compressor and vent unit coupled to the pneumatic tire, the compressor and vent unit configured to adjust the tire pressure of the pneumatic tire according to a target tire pressure;
   a unified pressure subsystem coupled to the compressor and vent unit configured to:
      measure the tire pressure of the pneumatic tire, and transmit the adjustment tire pressure to the compressor and vent unit; and
   a controller configured to:
      determine a target tire inflation pressure for a pneumatic compactor according to:
         a weight of the pneumatic compactor;
         a number of tires of the pneumatic compactor;
         a ground contact area of the tires;
         a compaction surface type;
         an ambient temperature,
      determine a tire adjustment pressure according to the difference between a current tire pressure and the target tire pressure; and
      transmit the tire adjustment pressure to the unified pressure subsystem.

2. The compactor machine of claim 1, further comprising an input device adapted to receive inputs from at least a temperature sensor, a tire pressure sensor, and a weight determining unit.

3. The compactor machine of claim 1, further comprising a user interface device including controller override capability.

4. The compactor machine of claim 1, further comprising a current tire pressure display unit.

5. The compactor machine of claim 2, further comprising the input device being adapted for receiving additional inputs related to target pressure override parameters, including the compaction surface and an overall machine weight.

6. The compactor machine of claim 3, further comprising the controller override capability being at least a function of the compaction surface type and an overall machine weight.

7. The compactor machine of claim 2, further comprising the weight determining unit being configured to determine the weight of the compactor machine according to a suspension displacement of the machine.

8. The compactor machine of claim 1, further comprising a plurality of pneumatic compactor tires, wherein pressure of the tires are managed under the unified pressure subsystem under which the tires may be incrementally inflated and/or deflated collectively to provide a common dynamically determined tire inflation pressure target.

9. A method of controlling ground contact pressure in a pneumatic compactor comprising:
   receiving a weight of the pneumatic compactor;
   receiving a number of tires of the pneumatic compactor;
   receiving a total ground contact area of the tires; and
   receiving an ambient temperature;
   receiving a compaction surface type;
   determining on a controller a target tire pressure according to the weight of the pneumatic compactor, the number of tires of the pneumatic compactor, the total ground contact area of the tires, the compaction surface type, and the ambient temperature;
   detecting a current tire pressure with a unified tire pressure subsystem;
   determining a tire adjustment pressure according to the difference between the current tire pressure and the target tire pressure; and
   inflating or deflating a tire pressure with a compressor and vent unit according to the determined tire adjustment pressure.

10. The method of claim 9, further comprising transmitting the current tire pressure to a display unit.

11. The method of claim 9, wherein receiving the weight of the pneumatic compactor comprises determining a current compactor weight according to compactor suspension displacement.

12. The method of claim 11, wherein the current compactor weight comprises the weight of the pneumatic compactor and a weight of a ballast.

13. The method of claim 9, further comprising receiving a target pressure override value and after the determining the target tire pressure, adjusting the target tire pressure to the target pressure override value.

14. The method of claim 9, further comprising:
   receiving a target pressure override value;
   evaluating the target pressure override value relative to the target tire pressure; and
   adjusting the target pressure override value when the target pressure override value substantially deviates from the target tire pressure.

15. A method of claim 9, wherein the inflating or deflating a tire pressure comprises collectively inflating or deflating a tire pressure on each tire of the pneumatic compactor.

* * * * *